United States Patent Office 2,782,929
Patented Feb. 26, 1957

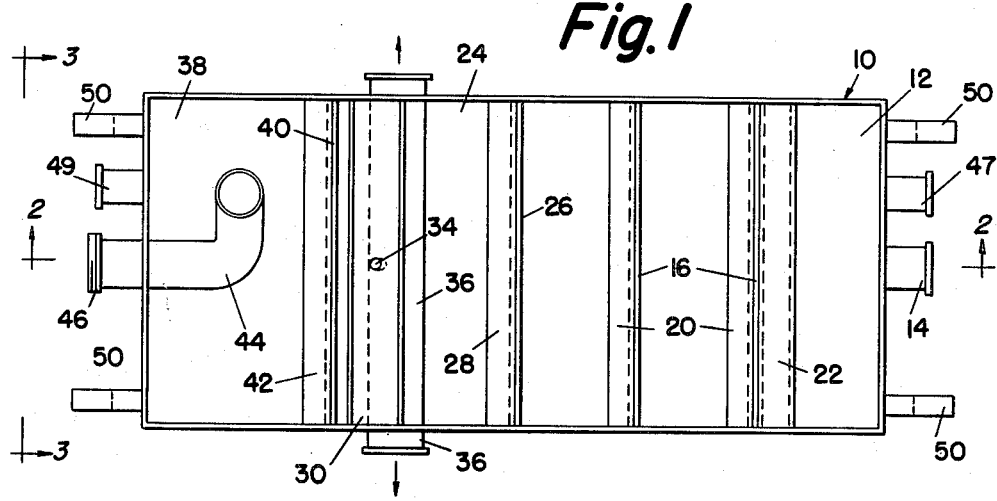
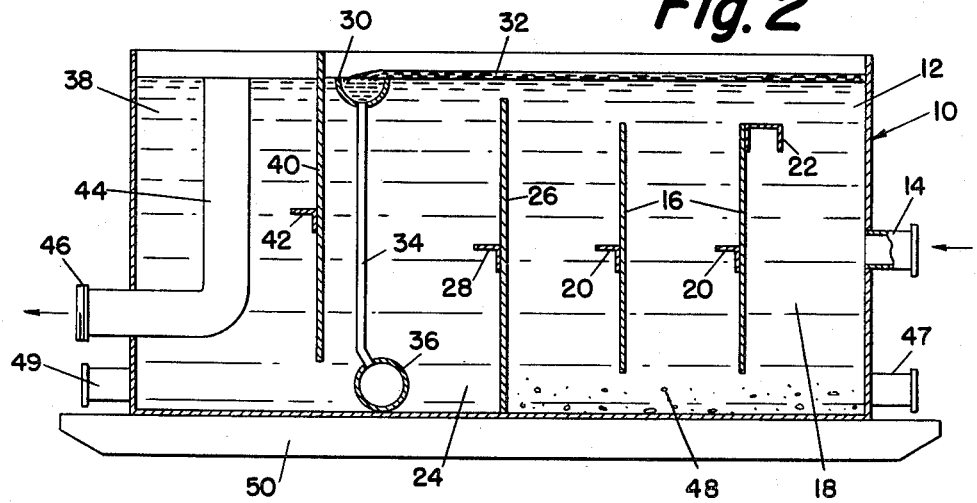
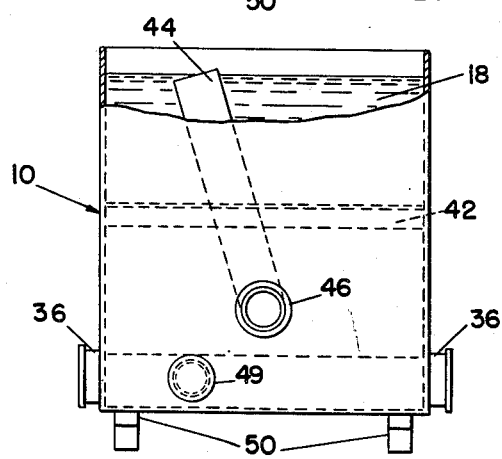

2,782,929

TANK CLEANING PORTABLE SEPARATOR

William W. Colket, West Chester, Pa., assignor to Sun Oil Company, Philadelphia, Pa., a corporation of New Jersey Application August 2, 1954, Serial No. 447,290

1 Claim. (Cl. 210—60)

The present invention relates to an apparatus for recovering the lighter of two substantially immiscible liquids of different specific gravities from a dispersion of the lighter liquid in the heavier or from an emulsion in which the lighter liquid is present in a minor proportion. More particularly, the invention relates to the recovery of a lighter liquid separated from a heavier liquid by gravity separation, and normally existing as a surface layer floating above a body of the heavier liquid, or dispersion or emulsion of such liquids, with an intervening interface. The invention is particularly concerned with an apparatus for recovering a thin film of a material such as oil separated from and floating on the surface of a material of higher specific gravity such as water.

In oil refinery operation, large volumes of waste water are derived from the various refinery equipment and processes. Naturally, this water contains quantities of oily materials which, if discharged without treatment, would produce contamination not only in any sewage treatment plant through which it might be passed, but also, if discharged into any natural body of water, navigable or otherwise, produces an undesirable pollution problem.

Normally large separating ponds or extensive settling chambers are used in which the oily materials are separated by gravity. Such separation requires comparatively shallow settling basins extending over a large area. These large basins require long settling periods and are limited to use by those facilities which adjoin them or are within easy pumping distance. Further the losses of petroleum products by evaporation from such basins cannot be controlled without incurring considerable expense to recapture the volatile products.

The problem of separating the lighter of two substantially immiscible liquids of different specific gravity is particularly bothersome where the liquid mixture results from cleaning operations in petroleum storage tanks. In hosing the inside of the storage vessel with water, the petroleum residue and solids are accumulated in large quantity and at a fast rate. To transfer this residue of liquids and solids resulting from the cleaning operation to remote settling basins is impractical and expensive. It is therefore an object of the present invention to provide means immediately available to every cleaning operation, which rapidly accomplishes the purpose of the heretofore used settling basins.

It is a further object of the invention to provide a means for recovering the lighter of two substantially immiscible liquids of different specific gravity removed by the cleaning operation, without delay incident to settling basin use, and thereby conserve products otherwise lost by evaporation.

Another object of the invention is to provide a means for removing petroleum products from wash water residues resulting from the cleaning operation of petroleum storage tanks, thereby permitting transfer of the resulting liquid directly to sewers without further treatment.

Further objects of the invention and the manner in which they have been attained will be evident from a reading of the following detailed description in the light of the attached drawings, in which:

Figure 1 is a top plan view of the separator.

Figure 2 is a side elevational view taken on line 2—2 of Figure 1.

Figure 3 is an end elevational view taken on line 3—3 of Figure 1.

In general the invention may be defined as a portable separator especially designed for the rapid handling of water-oil-solids residue. By being portable it is available for use between any storage vessel and the sewer and recovery tanks for petroleum materials.

In structure, it comprises a receptacle or tank of dimensions easily transported which is divided into three operating chambers or compartments. A rapid separating and settling compartment receives the wash residue. This compartment is divided into many sub-divisions to counteract the turbulence of the entering stream. A skimming compartment is connected to the settling compartment in such way as to present the petroleum residue for immediate removal. And lastly, a water removal and liquid depth control compartment forms the wash water outlet of the receptacle. Solids are removed from sludge openings adjacent the bottom of the receptacle at both ends.

For a detailed description of the device by which the generally mentioned functions are obtained, reference is made to the drawing. The three figures shown there will be described in detail numbering the same elements throughout with like numerals.

The receptacle 10, or tank as it is also called above, is shown as rectangular in shape. This is the simplest form and is shown here as the preferred embodiment. It will be understood, however, that other sectional shapes may be used.

Arranged to receive the flow of petroleum, solids and liquid mixed with wash water, the tank or receptacle 10 is divided into the first, or separating, compartment 12. The flange connection 14 is adapted to receive a hose which leads from the sump of the vessel being washed (not shown), conducting the wash residue thereto as indicated by the arrow.

Within the first compartment 12, a plurality of baffles 16 are vertically arranged transverse the flow direction of the liquid. These baffles 16 extend across the receptacle 10, as shown in Figure 1, from side wall to side wall. They do not, however, extend to the bottom of the receptacle, nor to the top of the liquid 18. Baffles 16 are braced in this position by the angles 20 shown supporting them.

At the top of the baffle 16 immediately adjacent the inlet 14, a turbulence control means 22 extends along the baffle to reduce the liquid movement. As will be described in discussing the operation of the device, the support angles 20 also counteract turbulence in this chamber.

Separating the compartment 12 from the skimming compartment 24, a partition 26 supported by an angle 28, extends from the floor of the receptacle to a point above the elevation of the baffles 16, but below the elevation of the liquid and the skimmer element 30.

By fixing the elevation of the skimmer element or trough 30 relative to the depth of the receptacle and the elevation of the respective baffles, uniformity of operation for predetermined liquid flows and pressure can be secured. This trough extends across the effective width of the receptacle as shown in Figure 1 and engages the floated petroleum products 32. A pipe 34 leads to the bottom of the receptacle from the trough where it engages the header 36. By this means, either end of the header can be connected to a pump line and the petroleum materials salvaged by the easiest, most direct, manner. Removal through the header 36 at the bottom of the vessel 10 leaves the surface undisturbed and facilitates separation of the immiscible liquids.

In this same way, connection is made with the third compartment 38, called the water removal and liquid-depth control compartment. Turbulence of the liquid at the surface point of the petroleum removal is avoided by partition 40 extending downwardly from a point above the maintained liquid level to a point above the bottom of the receptacle 10. Thus an opening is left to transmit the petroleum-and-solid-free wash liquid to the third compartment 38 on the way through the device. By supporting partition 40 on an angle member 42 a further retarding effect to turbulence is placed in the receptacle.

The outlet 44 or liquid depth control means is arranged for limited rotary movement as shown in Figure 3, in addition to being equipped to engage a hose at 46. By adjustment of the elevation of the top of the outlet 44 relative to the surface of the liquid, the depth of the liquids in the receptacle can be regulated within the limits of the flow volume and outlet measurements.

Arranged on each end of the receptacle 10 are sludge removal outlets 47 and 49. As shown they are normally capped, but can be opened to let out accumulated solids and sludge for cleaning. Because partition 26 separating the settling and skimming compartments extends to the bottom of the receptacle, two sludge outlets are required.

Skids 50 are shown as one means for mounting the above-described device to make it portable. It appears evident that wheels, floats, motor carrier or any other vehicular means may be used to obtain portability.

In operation, the separator is hose-connected to a collecting sump or other means of the vessel to be washed. As the wash water residue accumulates, it is admitted to the separating compartment 12 through inlet 14. The baffles 16, channel 22 and angles 20 present surfaces obstructing turbulent action and cause the solids 48 to drop and lighter specific gravity liquids 32 to rise.

Partition 26 stops movement along the bottom of the receptacle 10 and restricts the heavy solids to compartment 12. Liquid continues to move through the receptacle by spilling over the top of partition 26. The depth of this partition below the surface of the liquid in compartments 12 and 24 is such as to cause the minimum of liquid agitation commensurate with volume movement.

The liquid movement from inlet 14 to outlet 44 moves the layer of lighter liquids 32 on top of the water to the skimming or trough means 30 where it spills over. Pipe 34 transfers the lighter constituent to the header 36 where it is pumped out.

Movement of the wash water is continued from the second or skimming compartment 24 under the partition 40 into the third compartment 38. The outlet 44 is adjusted, as shown in Figure 3, to preserve a depth of liquid proper arranged to carry increasing or decreasing depths of petroleum products 32 to the skimming trough 30. By regulating the flow volume through the receptacle and the diameters of the effluent means, skimmer pipe 34 and outlet 44, the above described separator will rapidly and efficiently transmit wash water free of petroleum, liquids and solids, to sewer lines.

After the washing operation is completed, or during the work if necessary, the caps are removed from the sludge outlets 47 and 49 and the receptacle hosed out. The position of partition 26 between the settling and skimming compartments insures the larger solids and considerable of the sludge being deposited in the chamber of initial contact. However, any solids carried over partition 26 will settle out before removal of the wash water through outlet 44 and be readily removed through sludge outlet 49.

While the device best adapted to perform the functions set forth has been described as the preferred embodiment, it is obvious that various changes in form, proportion and in the minor details of construction may be resorted to, without departing from the spirit or sacrificing any of the principles of the invention.

What is claimed is:

An oil-water separator for use in cleaning petroleum storage tanks comprising a rectangular receptacle having an inlet and an outlet at opposite ends, a first partition extending upwardly from the bottom of the receptacle to terminate below the normal water line requiring the liquid to flow thereover, said partition being spaced from the inlet end of the receptacle to form a separating compartment therein; a plurality of spaced apart baffles extending between the walls of the receptacle substantially parallel to said first partition, each baffle suspended above the bottom of the receptacle and terminating at a point below the top of the first partition; a second partition extending downwardly from the top of the receptacle to terminate at a point above the bottom requiring the liquid flow to pass thereunder, said second partition spaced between the first partition and the outlet end forming a skimming compartment between the partitions and a depth control compartment adjacent the outlet; a skimming trough extending across the receptacle in the skimming compartment elevationally positioned to receive the floating oil; a drain connected to receive the skimmed oil from said skimmer; a depth control means connected to the outlet in the depth control compartment; and sludge drains at each end of said receptacle to remove collected debris from the bottom of the receptacle.

References Cited in the file of this patent

UNITED STATES PATENTS

| 748,981 | Oliver | Jan. 5, 1904 |
| 911,314 | Maranville | Feb. 2, 1909 |
| 2,479,386 | Matheis | Aug. 16, 1949 |
| 2,585,878 | Tryon | Feb. 12, 1952 |

FOREIGN PATENTS

| 9,770 | Great Britain | 1913 |
| 295,320 | Germany | Nov. 16, 1916 |